Patented Aug. 22, 1944

2,356,205

UNITED STATES PATENT OFFICE 2,356,205

PROCESS FOR INCREASING PRODUCTIVITY OF SUBTERRANEAN OIL-BEARING STRATA

Charles M. Blair, Jr., Webster Groves, and Sears Lehmann, Jr., University City, Mo., assignors to Petrolite Corporation, Ltd., Wilmington, Del., a corporation of Delaware No Drawing. Application October 21, 1942, Serial No. 462,884

5 Claims. (Cl. 252—8.55)

This invention relates to a process for increasing or restoring the production of oil or gas wells by means of a treatment of the subterranean strata of the wells with a unique fluid.

It has often been noted that the output of oil or gas wells falls off more rapidly than corresponds to the natural decline in production attributable to reservoir depletion. In other cases wells drilled into known productive formations are found to have a production rate much below that which would be predicted from information about the reservoir. These phenomena arise from various causes, most of which are related to plugging or stoppage of the pores of the formation. Such plugging may be caused by precipitates of organic materials, such as asphalt or paraffin; by iron sulfide, or by mud or mud constituents forced into the formation during drilling; or by connate water or other water which has encroached into or been forced into the formation and which adheres strongly to the sand particles of the formation, thus preventing transfer of oil through its pores.

It is well known that under various circumstances and occasions it is highly desirable to remove such objectionable deposits; for instance, when a well is first brought into production, or shortly thereafter, paraffin may be deposited in the subterranean strata immediately surrounding the well input. Such deposits may be brought about by a number of causes, as, for example, release of pressure, change in temperature, etc. At other times, it may be desirable to remove waxy deposits prior to the acidization of a calcareous oil-bearing strata. Acidization is the process commonly employed for introducing inhibited hydrochloric acid, or some other suitable acid medium into a well, in order to increase the porosity of the oil-bearing sands and enhance the productivity of the well. Sometimes it is desirable to remove waxy deposits or the like before resorting to a water shut-off operation. Water shut-off operations contemplate the type of procedures whereby an effort is made, at least partially, and preferably totally, to shut off an undesired water source by deposit of a non-permeable septum or membrane.

Other circumstances under which the removal of objectionable waxy solids or deposits essentially hydrocarbon in nature take place, include the flooding of oil-bearing strata or sands. Sometimes passage of oil from an abandoned or exhausted oil-bearing strata is prevented by deposits of the kind previously referred to. In such cases it is desirable to remove such deposits in order to permit the oil to pass to a predetermined outlet well. In other circumstances, it may be desirable to clean out or render water-wettable sands or strata, so that the incoming water used for the water drive may pass through the strata. It is to be noted, in some circumstances, the waxy or oily deposit removed may in essence be only an absorbed film or its equivalent. In other words, the actual step, broadly speaking, is only that of rendering an oil-wetted surface water-wettable. It is understood that the hereto appended claims include such particular application.

As an example of an instance where the present invention may be employed in connection with an oily or waxy material containing a large amount of inorganic material, reference is made to the removal of mud barriers. Although the mud barriers may be segregated in the main at the surface of the well, yet at times a considerable proportion of the drilling fluid passes into the adjacent porous formation, and must be removed by some suitable procedure. See U. S. Patent No. 2,278,909, dated April 7, 1942, to Bertness et al. The process herein contemplated is particularly adaptable to the removal of infiltrated drilling mud barriers.

After the solution, dispersion, or disruption of the waxy or allied occlusion, one may remove the resultant mixture in the same way that spent acid or the like is removed in the conventional acidization procedure. At times the removal, dispersion, or disruption of the objectionable deposit is best accomplished by means of a reciprocating action which forces the fluid into the strata and afterwards permits it to flow back into the well, followed by subsequent reinjection into the strata. Such reciprocating action may be repeated a number of times. The method employed to obtain such reciprocating action may be any of the conventional means. For instance, see U. S. Patent No. 2,139,595, dated December 6, 1938, to Lerch et al.

Briefly described, our process consists in introducing into a subterranean oil-bearing strata or sand, an agent which we herein refer to as a transparent emulsion, in view of the terminology already employed in the art. The means for injecting said agent or emulsion into the well or strata, is that commonly employed when similar materials, for instance, organic solvents, acids, water, solutions of detergents, or the like, are injected into the strata, in order to accomplish or attempt to accomplish the purposes previously enumerated, or for other purposes. Reference is made to the various patents concerned with acidization of calcareous oil-bearing strata, or to patents concerned with flooding processes for recovering oil from subterranean sands and other oil-bearing strata, for a more complete description of the physical means employed in practising our process.

Some of the transparent emulsions herein contemplated for the specific purpose set forth, are described in complete detail in our co-pending application Serial No. 462,884, filed October 21, 1942, which is concerned with the use of certain transparent emulsions as paraffin wax solvents. Other of the present solutions are described in the application of Charles M. Blair, Jr., Serial No. 462,883, filed October 21, 1942, which is concerned with the treatment of oil-producing formations to reduce their water permeability.

The process of the present invention contemplates the washing of producing formations with transparent emulsions which are solvents for both organic deposits and water or aqueous brine, and in addition, have detergent and peptizing action on insoluble deposits, such as mud, clay, sand, silt, and salts. Another valuable property of the washing liquids used in the present process is their vanishing, or nearly vanishing, interfacial tension against both oil and water. This property permits easy penetration of the fluid into either water wetted or oil-wetted capillaries with thorough contact and mixing with plugging materials. In addition, it permits easy removal of the used fluid, containing dissolved and suspended plugging material, from the formation.

Such homogeneous mixtures or solutions containing conventional paraffin, asphalt, or hydrocarbon oil solvents and water, are a special species of a type of material sometimes referred to as a micellar solution, or "transparent emulsion." "Transparent emulsions" is the name applied in the arts to mixtures in which a water-insoluble solvent is admixed with a solution of a wetting agent or the like in water or a brine, in the presence of a common or mutual solvent, so as to give a homogeneous mixture. Characterizing such mixtures as "transparent emulsions" is a misnomer, for the reason that they are not emulsions at all. An emulsion, by definition, is an apparently homogeneous mixture of two immiscible liquids. The homogeneity of an emulsion disappears when subjected to microscopic examination, as compared with the naked eye. An emulsion is essentially a heterogeneous system. "Transparent emulsions," as employed in the arts, represent true solution or sols which are not only homogeneous to the naked eye, but also homogeneous to the microscope. They have been referred to as "transparent emulsions" possibly for the reason that one would expect the components to produce an emulsion, rather than a microscopically homogeneous mixture, or else possibly, because there is some confusion, in that certain colloidal sols which are microscopically homogeneous are referred to as emulsoid type sols. Another explanation may be that in certain arts, for instance, in the application of agricultural sprays, there are employed certain mixtures, the majority of which are true emulsions and some of which, although of substantially the same composition, are homogeneous sols of the so-called transparent emulsion type. It may have been convenient to characterize all such mixtures as "emulsions," and then, perhaps improperly, refer to the transparent mixtures as "transparent emulsions."

These true solutions, or at least true sols, as differentiated from scientifically properly characterized emulsions, must not be confused with laboratory curiosities which are really transparent and which are really emulsions. For example, see "Laboratory Manual of Colloid Chemistry," by Holmes, page 63.

However, for purposes of convenience, and in order not to add further confusion to nomenclature which is already in use, we will herein refer to these microscopically homogeneous sols or solutions as "transparent emulsions," because such language is already adopted in the art. For example, see U. S. Patent No. 2,289,536, dated July 14, 1942, to Bradley.

In view of what has been said and in view of the general knowledge as to the manufacture of transparent emulsions, broadly, it is unnecessary to give any specific directions, except that generally speaking, the transparent emulsions herein contemplated for use as treating solutions are characterized by the presence of at least 15% water or an aqueous vehicle consisting of water in which there is dissolved salts, alkalies, or acids.

At this point it may be well to indicate that the transparent emulsions employed in the process herein described include not only those described in the literature, which fall within the specifications or descriptions hereinafter indicated, but also include the type or types in which the wetting agent employed is a cation-active material, or a material of the non-dissociated type. So far as we are aware, this latter type or types are broadly new and are claimed as new compositions of matter in our co-pending application Serial No. 462,886, filed October 21, 1942. Thus, the following description of the transparent emulsions employed in the present process includes not only types which are well known, but also the additional types above referred to.

The wetting agents which may be used in preparing the transparent emulsion employed in the herein described procedure, may be either cation-active, anion-active, or of the non-electrolytic type. Wetting agents generally have present at least one radical containing 10 or more carbon atoms and not more than 64 carbon atoms, per molecule. This is true of the wetting agents employed in the present instance as a component of the vehicle or solvent or dispersant employed in our present process. The hydrophobe portions of these wetting agents may be aliphatic, alicyclic, alkylalicyclic, aromatic, arylalkyl, or alkylaromatic. The preferred type of wetting agents are those in which the molecule contains a long, uninterrupted carbon chain containing from 10 to 22 carbon atoms in length. Examples of suitable anion-active wetting agents include the common soaps, as well as materials such as sodium cetyl sulfate, ammonium lauryl sulfonate, ammonium di-isopropyl naphthalene sulfonate, sodium oleyl glyceryl sulfate, mahogany and green sulfonates from petroleum or petroleum fractions or extracts, sodium stearamidoethyl sulfonate, dioctyl sodium sulfosuccinate, sodium naphthenate, and the like. As to other suitable sulfonates, see U. S. Patent No. 2,278,171, dated February 17, 1942, to De Groote and Keiser.

Suitable cation-active compounds include cetyl pyridinium chloride, stearamidoethyl pyridinium chloride, trimethyl-heptadecyl ammonium chloride, dimethyl-pentadecyl sulfonium bromide, octadecylamine acetate, 2-heptadecyl-3-diethylene diamino-imidazoline diacetate, etc.

Suitable non-electrolytic wetting agents include the oleic acid ester of nonaethylene glycol, the stearic acid ester of polyglycerol, etc.

Previous reference has been made to three types of surface-active compounds. It is, of course, well known that surface-active compounds are available, or can be readily prepared which exhibit the characteristics of more than one of the above mentioned types. For instance, reference is made to the type of materials described in U. S. Patent No. 2,262,743, dated November 11, 1941, to De Groote, Keiser and Blair. For convenience, in such instances where a surface-active material may show the characteristics of more than one of the above described types, it is understood that it may be classified under either or both types for the present purpose.

The mutual solvent or solubilizer components of the treating solutions or transparent emulsions employed in the present process are characterizable as compounds composed of a hydrophobic hydrocarbon residue of comparatively low molecular weight combined with hydrophilic group of low molecular weight and are free from surface-active properties. For convenience, a surface-active substance is one which, in comparatively small amounts, for instance, less than 0.1%, will enormously lower the surface tension of water and produce a coherent and persistent foam. The hydrophobic residue may contain from 2 to 12 carbon atoms and may be alkyl, alicyclic, aromatic, or alkyl substituted alicyclic or aromatic, or may be the hydrocarbon portion of a heterocyclic or hydrocarbon substituted heterocyclic group. The hydrocarbon residue may have branched or normal chain structure, but no branch may have a length of more than 7 carbon atoms from the point of attachment to the hydrophilic residue, counting a benzene or cyclohexyl group as being equivalent in length to an aliphatic chain of three carbon atoms. Where the hydrocarbon residue consists of not more than 4 carbon atoms, structures of the normal primary alkyl type are preferred. Where the residue is made up of more than four carbon atoms, then structures of secondary and tertiary types are also good where the second and third branches may be methyl or ethyl groups.

This hydrophobe hydrocarbon residue is combined either directly or indirectly with a hydrophilic group of one of the following sorts:

(a) A hydroxyl group which may be alcoholic, phenolic, or carboxylic;
(b) An aldehyde group;
(c) A carboxy amide group;
(d) An amine salt group;
(e) An amine group;
(f) An alkali phenolate group.

By "indirectedly combined with one of these groups" is meant that the hydrocarbon residue is combined—as by etherification, esterification, or amidification, etc.—with another organic residue which contains not more than four carbon atoms and also one or more of the hydrophilic groups named above, provided that after said combination, one at least of the hydrophile groups is left still free. Specific examples illustrating this class of compounds are: Ethyl alcohol, n-amyl alcohol, alpha-terpineol, p-cresol, cyclohexanol, n-butyraldehyde, n-butyric acid, glycol mono-butyrate, propyl lactate, mono n-butyl amine hydrochloride, n-propionamid, ethylene glycol mono n-butyl ether, pyridine, methylated pyridine, piperidine, or methylated piperidines.

The solubilizer (common solvent or hydrotropic compound above described) is essentially semi-polar liquid in the sense that any liquid whose polar character is no greater than that of ethyl alcohol and which shows at least some tendency to dissolve in water, or have water dissolved in it, is properly designated as semi-polar. This is consistent with the previous description and the two references pertaining thereto. Stated another way, the solubilizer or semi-polar liquid indicated may be illustrated by the formula X—Z, in which X is a radical having 2–12 carbon atoms, and which may be alkyl, alicyclic, aromatic, alkylalicyclic, alkylaryl, arylalkyl, or alicyclicalkyl in nature, and may furthermore, include heterocyclic compounds and substituted heterocyclic compounds. There is the added limitation that the longest carbon atom chain shall be less than eight carbon atoms, and that, in such characterization, cyclic carbon atoms shall be counted as one-half. Z represents —OH

—NH₂

—COOH

—OMe if X is an aryl radical. (Me is an alkali metal atom);

if X is a cyclic tertiary amine nucleus;

if X is a cyclic secondary amine nucleus; or the semi-polar liquid may be indicated by the following formula: —X—Y—R—(Z)ₙ. Here X and Z have their previous significance, R is —CH₂—, —C₂H₄—, —C₃H₅=, —C₃H₆— or

—C₂H₄—O—C₂H₄— and n is either one or two as the choice of R demands. Y is one of the following:

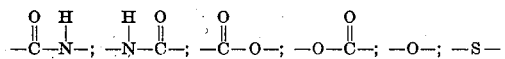

In general, these solubilizers are liquids having dielectric constant values between 6 and 26, and have at least one polar group containing one or more atoms of oxygen, and/or nitrogen.

It, perhaps, is significant that all of the solubilizers, with the possible exception of the alkali phenolates, are of types known to be able to form hydrogen bonds.

There are certain obvious limitations imposed by fundamental chemistry in the selection of the semi-polar component which does not require elaboration. For instance, if the semi-polar component contains a free carboxyl, then the presence of an alkali in the polar component, i. e., the aqueous vehicle, would destroy the carboxyl radical. In most instances this would be extremely objectionable. If an acid were present in the polar component, i. e., the aqueous vehicle, then such acid would, of course, decompose an alkali phenolate.

It is, of course, obvious that the reference to an amine salt group and an amine group is a difference of definition or degree, rather than a difference in kind. Actually, an amine, in the presence of water, probably combines with the water to give an ammonium base. Such an ammonium base may be considered as the salt derived from the water, considered in the light of an acid. This is illustrated by the following:

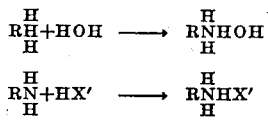

where X' is an anion.

The choice of solubilizer or common solvent and its proportion in the mixture, depends somewhat upon the wetting agent used, the amount and kind of oil used, and the proportion of water used, and is best determined by preparing experimental mixtures on a small scale. Various representative formulae will be given later.

The non-polar solvents which may be used in preparing the solvents employed in our process, are the liquid, water-insoluble, hydrocarbons, halogenated, and more especially, chlorinated hydrocarbons, and carbon disulfide, and preferably those which have high solvent power for paraffin wax, asphalt and hydrocarbon oils. Examples of suitable oils are: Kerosene, gasoline, benzol, chlorobenzene, carbon tetrachloride, trichlorethylene, carbon disulfide, methyl iodide, dichlorethane, bromobenzene, xylene, turpentine, pressure distillate, amylene dichloride, gas oil, various petroleum fraction extracts, and the like. Crude petroleum may be used in some instances.

In some cases it is desirable to include in the solvents small amounts of acid, alkali, or inorganic salts, as it has been found that the presence of these electrolytes often gives solutions having a wider range of miscibility with water and organic materials. The examples below include some solvents containing such ingredients. Excess acid, when used, will, in general, be in solutions containing a cation-active or non-electrolytic wetting agent. Excess alkali, when used, will usually be in a solution containing anion-active wetting agents.

*Example 1*

| | Percent |
|---|---|
| Sodium oleate | 14.5 |
| n-Butanol | 11.5 |
| Xylene | 52.7 |
| NaCl | 0.3 |
| Na₂CO₃ | 0.5 |
| Water | 20.5 |
| | 100.0 |

*Example 2*

| | Percent |
|---|---|
| Sodium oleate | 16.0 |
| n-Butanol | 8.9 |
| Kerosene | 51.5 |
| Na₂CO₃ | 1.6 |
| Water | 22.0 |
| | 100.0 |

*Example 3*

| | Percent |
|---|---|
| Green petroleum sulfonate (ammonium salt) | 17.2 |
| Sodium oleate | 8.6 |
| Alpha-terpineol | 8.1 |
| Kerosene | 40.3 |
| Water | 25.8 |
| | 100.0 |

*Example 4*

| | Per cent |
|---|---|
| Sodium oleate | 4.8 |
| CCl₄ | 43.0 |
| Ethylene glycol mono-butyl ether | 4.1 |
| NaOH | 0.5 |
| Water | 47.6 |
| | 100.0 |

*Example 5*

| | Per cent |
|---|---|
| Green petroleum sulfonate (ammonium salt) | 14.5 |
| Sodium oleate | 10.4 |
| Rosin oil | 10.4 |
| Kerosene | 48.0 |
| Water | 16.7 |
| | 100.0 |

*Example 6*

| | Per cent |
|---|---|
| Sodium oleate | 8.5 |
| Sulfonated sperm oil (NH₄OH neutralized) | 1.0 |
| n-Butyl alcohol | 4.6 |
| Destructively distilled turpentine | 12.4 |
| Aromatic kerosene | 13.8 |
| Carbon tetrachloride | 9.3 |
| Water | 49.9 |
| Sodium hydroxide | 0.5 |
| | 100.0 |

*Example 7*

| | Per cent |
|---|---|
| Hexadecylamine acetate | 10.0 |
| n-Butanol | 18.0 |
| Kerosene | 34.0 |
| Water | 38.0 |
| | 100.0 |

*Example 8*

| | Per cent |
|---|---|
| 2-heptadecyl-3-diethylene diamino-imidazoline diacetate | 12.0 |
| Alpha-terpineol | 7.0 |
| Kerosene | 14.0 |
| Water | 67.0 |
| | 100.0 |

*Example 9*

| | Per cent |
|---|---|
| Octadecylamine hydrochloride | 9.0 |
| Ethylene glycol mono-butyl ether | 27.0 |
| Benzene | 27.0 |
| Water | 37.0 |
| | 100.0 |

*Example 10*

| | Per cent |
|---|---|
| Nonaethylene glycol mono-oleate | 11.7 |
| 95% ethyl alcohol | 8.8 |
| CCl₄ | 34.3 |
| Aqueous HCl (10% HCl by weight) | 45.2 |
| | 100.0 |

Example 11

| | Per cent |
|---|---|
| Sodium oleate (anhydrous) | 2.86 |
| n-Propyl alcohol (anhydrous) | 2.48 |
| CCl₄ | 19.75 |
| Water | 71.68 |
| NaOH | 0.16 |
| Na hexametaphosphate | 3.07 |
| | 100.00 |

Example 12

| | Ml. |
|---|---|
| Oleic acid | 5 |
| n-Butylamine | 5 |
| Benzene | 20 |
| 11.1% aqueous NaOH solution | 11 |
| Water | 50 |

Example 13

| | Ml. |
|---|---|
| Lauric acid | 5 |
| p-Cresol | 5 |
| Kerosene | 20 |
| Aqueous ammonia (4.7% NH₃) | 15 |
| 15% aqueous NH₄Cl solution | 3.5 |
| Water | 80 |

Example 14

| | Ml. |
|---|---|
| 2-heptadecyl-3-triethylenetriaminoimidazoline | 5 |
| n-Butyraldehyde | 5 |
| CCl₄ | 20 |
| 10% aqueous acetic acid solution | 25 |
| 16% aqueous NaCl solution | 0.5 |
| Water | 20 |

Example 15

| | Ml. |
|---|---|
| 2-heptadecyl-3-triethylene triaminoimidazoline | 5 |
| Phenol | 5 |
| CCl₄ | 20 |
| 10% aqueous acetic acid solution | 15 |
| 16% aqueous NaCl solution | 1.5 |
| Water | 45 |

Example 16

| | Ml. |
|---|---|
| 2-heptadecyl-3-triethylenetriaminoimidazoline | 5 |
| n-Butyric acid | 5 |
| CCl₄ | 20 |
| 10% aqueous HCl solution | 15 |
| 16% aqueous NaCl solution | 7 |
| Water | 45 |

The above percentages are by weight.

It may be well to point out that in the above examples one is not limited to a single type of ingredient. For instance, the non-polar solvent used may be a mixture of two or more different solvents, as, for example, a mixture of benzene and kerosene. Similarly, the common solvent may represent a mixture, as, for example, a mixture of ethyl alcohol and ethylene glycol mono-butyl ether. Likewise, the aqueous phase may consist of a solution of more than one electrolyte, for example, a mixture of caustic soda and sodium hexametaphosphate. Similarly, the wetting agent may represent a mixture, as, for example, a mixture of octaethylene glycol mono-oleate and decaethylene glycol mono-oleate.

In view of the well known art on the subject (see "Advances in Colloid Science," 1942, page 99; and also Journal of Physical Chemistry, volume 43, page 495), it is well understood that one could not necessarily employ any or all of the above mentioned components in any or all combinations, and invariably and inevitably obtain a transparent emulsion. All the components indicated can be used satisfactorily in conjunction with various of the other components within definite proportions and limitations to give suitably transparent emulsions. Such statement is entirely consistent with the available technical knowledge in regard to these peculiar combinations.

Certain limitations in forming the transparent emulsions or micellar solutions are apparent and have been previously suggested. For instance, one would not use sodium oleate in presence of an acid. One would not employ an alkaline phenolate in the presence of acid. Likewise, one would not ordinarily mix a cation-active wetting agent and an anion-active wetting agent. Furthermore, if an acid is present in any appreciable amount, one would probably use a cation-active wetting agent.

As to the non-polar solvents, it is obvious that they are chemically inert for all practical purposes and that there is little to choose from in the particular selection, except to the degree that they are effective solvents for the organic deposits.

The hydrocarbons yield homogeneous emulsions possibly with greater ease than carbon bisulfide or the chlorinated hydrocarbons. The difference, in a general way, is not great. Briefly, then, the selection of the non-polar solvent is not apt to be critical, although the amount which may be introduced in a particular combination may vary to a marked degree. The common solubilizer shows greater variation than the non-polar solvent, although it too is chemically inert; and as previously indicated, the most suitable types are those showing maximum semi-polarity, that is, the type that begins to approach n-butanol, alpha-terpineol, ethylene glycol mono-ethyl ether, n-propyl alcohol, pyridine, or ethanol. As to the polar component, water alone may be employed almost without exception; but in many cases translucent products are those which are on the verge of being satisfactory, become homogeneous on the addition of an electrolyte. Furthermore, where water gives a perfectly satisfactory emulsion, it is sometimes desirable to increase the aqueous component; and when this is done, not infrequently one runs into difficulties, unless an electrolyte is added. The electrolyte may or may not be inert.

Thus, it is obvious that on a broadly comparative basis, there is not a great deal of difference between the various non-polar solvents; and there is not a great deal of difference between the common solvents within the scope indicated; and this also applies to the aqueous component. There is, however, considerable difference in the suitability of any particular wetting agent. This is the component whose behavior is least predictable and whose selection, in a particular transparent emulsion, requires greater care, for the reason that there is such a wide variety of wetting agents. Furthermore, it is the nature of the wetting agent, which, to a marked degree, determines the final combination or combinations, that will yield satisfactory transparent emulsions. The emulsions which can be satisfactorily prepared from some wetting agents, for instance, from green acid sulfonates derived from petroleum, are very limited in scope; whereas, other wetting agents, such as sodium oleate, appear to be suitable in practically any combination and in connection with a wide variety of individual ingredients. Accordingly, one may conveniently resort to experimental procedure, which will roughly determine the nature of any particular wetting agent which is contemplated for use.

This experimental procedure is as follows:

The contemplated wetting agent is purified and particularly so as to remove any inorganic electrolytes. A sufficient amount of the wetting agent is weighed out so as to equal 6 grams of the wetting agent on an anhydrous basis. 7 cc. of the solubilizer are added and intimately mixed with the wetting agent. 20 cc. of water are then added. Many types of wetting agents, for instance, ammonium oleate, become partially hydrolyzed in the aqueous solution. Thus, it is well to suppress the hydrolysis by adding a small proportion of the appropriate acid or alkali, as the particular case demands. The amount added may represent one-half percent or less, based on the water previously added. If sodium oleate is used as the wetting agent, a half percent of caustic soda may be employed. Not over 20 cc. of the non-polar solvent is added slowly to the mixture previously prepared and stirred constantly; and at the same time the clarity of the resultant mixture is noted. Then more water is added slowly with continual stirring until at least 300 cc. of water have been added and possibly some more. Note that the clarity of the mixture should be observed during the last two stages, i. e., while the non-polar solvent is being added in an amount not in excess of 20 cc. and while the water is being added in an amount at least equal to 300 cc. Somewhere during the course of the addition of the non-polar solvent or the subsequent addition of more water, a clear solution or transparent emulsion is probably obtained. The experiment may be repeated several times; for instance, it is preferable to use carbon tetrachloride as the solvent and n-butanol as the solubilizer during the first experiment. During the second experiment kerosene may be used as a solvent and alpha-terpineol as the solubilizer. During the third experiment the combination of carbon tetrachloride and alpha-terpineol may be used; and in the fourth experiment the combination of kerosene and n-butanol may be used. Similarly, the experiments can be repeated, adding a small amount of electrolyte, for instance, approximately one-half of one percent of caustic soda, to the water which is used in the final dilution step. In any event, such series of experiments will readily indicate one or more proportions which give transparent emulsions, and thus provide a working basis from which one can mechanically or by cut-and-dried procedure, prepare other variations. It is to be noted that the experimental proportions above indicated are not considered as limitations as to the specific composition of the emulsions herein contemplated.

In some instances, it may be necessary to repeat experiments at 70° C., or thereabouts, instead of room temperature. In other words, at such elevated temperatures one may obtain a homogeneous mixture, which is not obtainable at room temperature. It may also be desirable to repeat experiments, using a 10% hydrochloric acid solution, by weight, as the aqueous constituent. In some instances, cation-active wetting agents, or similar acid-resistant substances, give homogeneous solutions only in the presence of an acidic component of the kind indicated.

In a large majority of cases the limit of proportionality between the several components and within the homogeneous systems cannot be predicted beforehand with mathematical accuracy, but must be determined experimentally. However, having used the experimental procedure previously outlined, one can readily determine at least one region of homogeneity. It is a simple matter to determine the limitations of this particular region by varying the amounts of the component in the customary manner of all such procedures, i. e., hold all other components constant and vary one at a time. This provides an easy experimental exploratory method to determine the limits of any homogeneous region. Further alteration in the extent of the homogeneous region obtained with a given wetting agent may be made by change of solvent or change of solubilizer, or by addition of an electrolyte which is compatible with the wetting agent. It is noteworthy that as many mixtures of this type are diluted with water or solution of an electrolyte, that there appears to be more than one separate and successive region of homogeneity and the one of greater or greatest dilution that is the one obtained in latter stages of dilution, is usually broader and less critical as to composition. The limits of homogenity are usually quite sharp and easily determined by mere visual examination. In some cases supersaturated solutions appear to form which break into heterogeneous systems on standing. For this reason, if a combination is selected which appears on the edge of a homogeneity zone, then the particular combination should be allowed to stand for a long enough period of time, for instance, a few hours or a few days, to insure that it will be permanently stable. Sometimes this change may be due to an equilibrium involving hydrolysis.

Returning momentarily to the experimental procedure previously discussed, it is to be noted that the relative proportion in which the several components of this type of solution may be present may have considerable variation; but a clear solution containing 6 g. of wetting agent, 5 g. of solubilizer, 20-30 g. of non-polar solvent, and 20-200 g. of water containing electrolyte in most instances, is apt to give a suitable transparent emulsion on a first trial mixture, and also is apt to be one which comes within the limits hereinafter indicated.

What has been said previously, together with what is a matter of common knowledge, is more than ample for a person skilled in the art, by experiment, to predetermine proper proportions of the components, in order to obtain transparent emulsions of the kind herein contemplated.

It may be well at this point to emphasize the fact that the solvent and the dispersant effect of transparent emulsions of the kind previously described is not completely understood.

A brief recapitulation of the general nature of the transparent emulsions herein contemplated appears desirable. As has been pointed out, they comprise three liquid components, one of which is a non-polar solvent, for paraffin wax, asphalt or hydrocarbon oils; another is a semi-polar or hydrotropic common solvent or solubilizer, and the third is an aqueous component, which must be present, at least to the extent of 15% by weight, and consist of the polar substance water, in which there may be dissolved electrolytes, which are, of course, even more polar than the water itself. For convenience, the polar aqueous component will be referred to as having a polarity equal at least to water. This appears entirely proper, in that solutions of an electrolyte in water can be properly considered as having a polarity greater than water in the light of their electrical conductivity. The fourth component, of course, is the wetting agent or agents previously described in detail, suitable in amount and quantity to insure homogeneity of the other components with each other, and jointly with the wetting agent. In connection with the semi-polar component or solubilizer, sometimes referred to as a common solvent, see U. S. Patent No. 2,158,374, dated May 16, 1937, to Merrill; and also the aforementioned Bradley patent.

Attention will now be directed particularly to at least four of the rather significant features of the transparent emulsions intended to be used as the treating solution of our present process. In the first place, the solvent property of the transparent emulsion considered purely as a solvent, is still significant and compares favorably with that which would be expected to be contributed by the non-polar solvent component, in absence of other components. In other words, one can dissolve a powdered paraffin wax in such transparent emulsions in an amount which is about the same or even greater than one would expect if the non-polar solvent constituent were available in absence of the other components of the emulsion. Secondly, when a solid hydrocarbon surface or paraffinoid surface is subjected to contact with a transparent emulsion of the kind herein contemplated, the major portion of the non-polar solvent passes from the transparent emulsion into the wax or paraffinoid substance, and causes it to swell and soften, and instigates initial disruption. This phenomenon may be illustrated by comparison with a solution of a paraffin wax solvent in some other medium, as, for example, a straight run aliphatic kerosene or crude oil. Such kerosene or a crude oil has only weak solvent action upon medium melting point paraffin wax. If an excellent paraffin solvent, such as carbon tetrachloride, is mixed with such kerosene or crude oil in the proportion of one part of the tetrachloride to four parts of the hydrocarbon, one has a mixture from which paraffin wax will absorb little or no carbon tetrachloride, if intimate contact is obtained under suitable conditions. If, however, one employs a transparent emulsion of the kind herein contemplated containing an equal amount of carbon tetrachloride, it will be found that under identical conditions, a major proportion of the carbon tetrachloride is absorbed by the wax, and such wax-carbon tetrachloride solution is then self-disintegrating in the presence of the remaining constituents of the transparent emulsion. This property is probably concerned with the partition coefficient, adsorption at solid interfaces, etc., but regardless of the basic mechanism or physical chemistry involved, the transparent emulsions, as herein contemplated, exhibit this property in a most useful manner. Thirdly, the wetting agent present, in conjunction with the common solvent or semi-polar liquid, appears to act as a dispersing agent, even in the absence of any marked or vigorous mechanical agitation, although such agitation may be desirable. This characteristic property is of marked value in instances which will be hereinafter referred to. For instance, it is obvious that if a transparent emulsion is forced into a subterranean oil-bearing starta, there is little or no opportunity for agitation in such strata. In other words, ability to remove organic, as well as inorganic, deposits, under such circumstances, must depend upon some other disruptive force than agitation. The transparent emulsions herein contemplated exhibit such particularly desired property. Fourthly, it may be well to point out that these properties, jointly, or in conjunction with others not mentioned or necessarily understood, permit the removal, for example, of an amount of formation clogging deposits far in excess of what could be removed by a solvent of the usual non-polar type.

As to the limits of the various constituents of the treating agent employed in our process, the following will serve as a guide, the percentages being by weight:

| | Percent |
|---|---|
| Non-polar hydrocarbon solvent | 5 to 75 |
| Semi-polar mutual solubilizer | 2 to 30 |
| Aqueous component | 15 to 90 |
| Dispersing agent | 2 to 20 |
| Electrolyte | From as little as 0.1 or less to 5 |

Although the exact function of the electrolytes previously referred to is not completely understood, the effect, in part, may be due to the ability to bind water, i. e., become hydrated. This suggests that certain other materials which are highly hydrophile in character and clearly differentiated from the classes of non-polar solvents and semi-polar solubilizers may be the functional equivalent of an electrolyte. Substances of this class which ordinarily do not dissociate include glycerol, ethylene glycol, diglycerol, sugar, glucose, sorbitol, mannitol, etc.

Reference has been made to the fact that the present process may be employed in regard to oil-bearing strata broadly, i. e., oil-bearing strata, which may immediately surround the working parts of a well or oil-bearing strata which may be subjected to a water or gas drive procedure, or other means, as differentiated from a conventional well. The most important application is in connection with the strata immediately surrounding conventional well bores.

Attention is directed to the fact that one obtains unusually desirable results in a number of instances where acidization and formation treating by the present process are conducted simultaneously. For instance, in an oil-bearing limestone structure, where there is some impediment or clogging due to paraffin or other deposits unaffected by acid, the present process may be employed with hydrochloric acid or the like present as one of the constituents, i. e., as the electrolyte, or as an added substance over and above the ordinary constituents. Such mixture, i. e., a transparent solvent having present a substantial amount of hydrochloric acid, will serve not only to remove the paraffin or other occluding material, but also will increase the porosity, due to the decomposition of limestone. The substantially zero interfacial tension previously referred to is of marked importance in this specific application.

When inorganic materials occur in oil-bearing strata, they are usually commingled with or wetted by oily or waxy materials. As has been previously pointed out, the waxy or oily components serve as a binder or adhesive, and disintegration and removal is dependent upon the same phenomena as occurs in the removal of wax or similar substances. In addition, the detergent and peptizing properties of the transparent emulsions are effective in removing insoluble deposits, whether organic or inorganic.

It is interesting to note that other examples of the semi-polar liquid used as a common solvent includes:

$$CH_3CH_2CH_2CH_2-O-CH_2CH_2OH$$

(ethylene glycol mono-butyl ether)

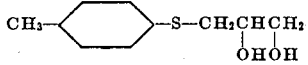

(glycerol mono-tolyl thio ether)

$$CH_3CH_2CH_2CH_2-O-\overset{O}{\underset{\|}{C}}-\underset{\underset{OH}{|}}{C}HCH_3$$

(n-butyl lactate)

$$CH_3CH_2CH_2\overset{O}{\underset{\|}{C}}-O-CH_2CH_2-O-CH_2CH_2OH$$

(diethylene glycol mono-butyrate)

$$CH_3CH_2CH_2\overset{O}{\underset{\|}{C}}-\overset{H}{\underset{|}{N}}-CH_2CH_2NH_2$$

(n-butyramido ethylene amine)

$$\underset{\underset{OH}{|}}{CH_2}\overset{O}{\underset{\|}{C}}-\overset{H}{\underset{|}{N}}-CH_2CH_2CH_2CH_2CH_3$$

(glycolic acid n-amyl amide)

Attention is directed to our co-pending application Serial No. 462,885, filed October 21, 1942.

Having thus described our process, what we claim as new and desire to secure by Letters Patent is:

1. In the process of increasing the productivity of oil-bearing strata by removal of wax, associated occlusions, and brine, the step of subjecting the strata to the action of a transparent emulsion of predetermined composition, consisting of (a) at least 15% and not over 90%, by weight, of an aqueous polar component whose polarity is at least equal to that of water; (b) at least 5% and not more than 75%, by weight, of a non-polar solvent having a solvent capacity for medium melting point paraffin wax which is at least one-third that of carbon tetrachloride under comparable conditions at normal temperatures; (c) at least 2% and not more than 20% of a water-soluble wetting agent; and (d) at least 2% and not more than 30%, by weight, of an organic semi-polar common solvent of a dielectric constant in excess of 6 and not over 26, the hydrophobic radical of said solvent containing from 2 to 12 carbon atoms, with the proviso that the longest carbon atom chain in said hydrophobic radical shall be less than 8 carbon atoms and that in such carbon atom chain length determination, cyclic carbon atoms shall be counted as one-half, and with the added proviso that the addition of a semi-polar common solvent within the limits indicated to the three prior constituents, shall be at least sufficient to render all components mutually soluble.

2. The process of claim 1, wherein the objectionable solid matter is located in the oil-bearing strata immediately surrounding the oil well.

3. The process of claim 1, wherein the objectionable solid matter is located in the oil-bearing strata immediately surrounding the oil well and the wetting agent is anion-active.

4. The process of claim 1, wherein the objectionable solid matter is located in the oil-bearing strata immediately surrounding the oil well and the wetting agent is cation-active.

5. The process of claim 1, wherein the objectionable solid matter is located in the oil-bearing strata immediately surrounding the oil well and the wetting agent is non-dissociated.

CHARLES M. BLAIR, JR.
SEARS LEHMANN, JR.